(12) United States Patent
Cantin

(10) Patent No.: US 8,825,573 B2
(45) Date of Patent: *Sep. 2, 2014

(54) CONTROLLING QUARANTINING AND BIASING IN CATACLYSMS FOR OPTIMIZATION SIMULATIONS

(71) Applicant: International Business Machines Corporation, Armonk, NY (US)

(72) Inventor: Jason F. Cantin, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/916,301

(22) Filed: Jun. 12, 2013

(65) Prior Publication Data

US 2013/0275351 A1    Oct. 17, 2013

Related U.S. Application Data

(63) Continuation of application No. 12/954,296, filed on Nov. 24, 2010, now Pat. No. 8,489,526.

(51) Int. Cl.
*G06N 3/12*    (2006.01)

(52) U.S. Cl.
USPC .......................................................... 706/13

(58) Field of Classification Search
None
See application file for complete search history.

(56) References Cited

U.S. PATENT DOCUMENTS

| | | |
|---|---|---|
| 5,343,554 A | 8/1994 | Koza et al. |
| 5,363,098 A | 11/1994 | Antoshenkov |
| 5,390,283 A | 2/1995 | Eshelman et al. |
| 5,443,076 A | 8/1995 | Bau |
| 5,651,099 A | 7/1997 | Konsella |
| 5,742,738 A | 4/1998 | Koza et al. |
| 5,857,196 A | 1/1999 | Angle et al. |
| 5,946,674 A | 8/1999 | Nordin et al. |
| 6,031,935 A | 2/2000 | Kimmel |
| 6,057,424 A | 5/2000 | Vail |

(Continued)

FOREIGN PATENT DOCUMENTS

| | | |
|---|---|---|
| WO | 9963997 | 12/1999 |
| WO | 0167186 | 9/2001 |

(Continued)

OTHER PUBLICATIONS

"Crossover and Mutation", http://www.obitko.com/tutorials/genetic-algorithms/crossover-mutation.php Marek Obitko, 1998, 1 page.

(Continued)

*Primary Examiner* — Jeffrey A Gaffin
*Assistant Examiner* — Mikayla Chubb
(74) *Attorney, Agent, or Firm* — DeLizio Gilliam, PLLC

(57) ABSTRACT

Some examples are directed to determining a frequency of occurrence of a first value in a component of a first plurality of candidate solutions for an optimization problem where the first plurality of candidate solutions has converged on a suboptimal solution during a computer simulation that tests fitness of the first plurality of candidate solutions. Some examples are further directed to determining a second value that is inversely biased from the frequency of occurrence of the first value. Some examples are further directed to including the second value in a component of at least a portion of a second plurality of candidate solutions, where the component of the at least the portion of the second plurality of candidate solutions corresponds to the component of the first plurality of candidate solutions.

20 Claims, 7 Drawing Sheets

(56) References Cited

U.S. PATENT DOCUMENTS

| | | | |
|---|---|---|---|
| 6,058,385 | A | 5/2000 | Koza et al. |
| 6,128,607 | A | 10/2000 | Nordin et al. |
| 6,260,031 | B1 | 7/2001 | Schaffer et al. |
| 6,442,582 | B1 | 8/2002 | Hale |
| 6,532,076 | B1 | 3/2003 | Sidorowich |
| 6,532,453 | B1 | 3/2003 | Koza et al. |
| 6,539,366 | B1 | 3/2003 | Doyle et al. |
| 6,553,357 | B2 | 4/2003 | Mathias et al. |
| 6,691,285 | B1 | 2/2004 | Burden et al. |
| 6,725,326 | B1 | 4/2004 | Patra et al. |
| 6,882,989 | B2 | 4/2005 | Stevens |
| 7,031,887 | B2 | 4/2006 | Jain et al. |
| 7,037,735 | B2 | 5/2006 | Noguchi et al. |
| 7,043,463 | B2 | 5/2006 | Bonabeau et al. |
| 7,045,674 | B2 | 5/2006 | Davisson |
| 7,098,055 | B2 | 8/2006 | Noguchi et al. |
| 7,191,168 | B1 | 3/2007 | Buchsbaum et al. |
| 7,313,666 | B1 | 12/2007 | De Silva et al. |
| 7,383,235 | B1 | 6/2008 | Ulyanov et al. |
| 7,443,496 | B2 | 10/2008 | Noguchi et al. |
| 7,451,121 | B2 | 11/2008 | Wu et al. |
| 7,469,237 | B2 | 12/2008 | Cooper |
| 7,514,407 | B2 | 4/2009 | Averback |
| 7,560,248 | B1 | 7/2009 | Raines |
| 7,603,326 | B2 | 10/2009 | Bonabeau et al. |
| 7,616,763 | B2 | 11/2009 | Le Buhan et al. |
| 7,639,350 | B2 | 12/2009 | Noguchi et al. |
| 7,692,779 | B2 | 4/2010 | Noguchi et al. |
| 7,743,150 | B1 | 6/2010 | Carter et al. |
| 7,937,569 | B1 | 5/2011 | Sander et al. |
| 7,940,383 | B2 | 5/2011 | Noguchi et al. |
| 8,140,766 | B2 | 3/2012 | Bell, Jr. et al. |
| 8,312,455 | B2 | 11/2012 | Bell, Jr. et al. |
| 8,327,126 | B2 | 12/2012 | Bell, Jr. et al. |
| 8,352,712 | B2 | 1/2013 | Bell, Jr. et al. |
| 8,370,584 | B2 | 2/2013 | Cantin et al. |
| 8,379,847 | B2 | 2/2013 | Bell, Jr. et al. |
| 8,397,030 | B2 | 3/2013 | Cantin et al. |
| 8,489,526 | B2 | 7/2013 | Cantin |
| 8,515,882 | B2 | 8/2013 | Bell, Jr. et al. |
| 2002/0016782 | A1 | 2/2002 | Cooper |
| 2002/0019975 | A1 | 2/2002 | Johnson |
| 2002/0120407 | A1 | 8/2002 | Stevens |
| 2002/0183510 | A1 | 12/2002 | Vail |
| 2003/0028578 | A1 | 2/2003 | Jain et al. |
| 2003/0055614 | A1 | 3/2003 | Pelikan et al. |
| 2004/0002460 | A1 | 1/2004 | Averback |
| 2004/0008883 | A1 | 1/2004 | Shi et al. |
| 2004/0010479 | A1 | 1/2004 | Ali |
| 2004/0024750 | A1 | 2/2004 | Ulyanov et al. |
| 2004/0029809 | A1 | 2/2004 | Averback |
| 2004/0044633 | A1 | 3/2004 | Chen |
| 2004/0133929 | A1 | 7/2004 | Davisson |
| 2004/0143559 | A1 | 7/2004 | Ayala et al. |
| 2004/0210545 | A1 | 10/2004 | Branke et al. |
| 2004/0254901 | A1 | 12/2004 | Bonabeau et al. |
| 2005/0044052 | A1 | 2/2005 | Zhu |
| 2005/0159897 | A1 | 7/2005 | Anderson et al. |
| 2005/0197978 | A1 | 9/2005 | Anderson et al. |
| 2005/0197979 | A1 | 9/2005 | Anderson et al. |
| 2006/0195204 | A1 | 8/2006 | Bonabeau et al. |
| 2007/0116267 | A1 | 5/2007 | Speirs et al. |
| 2007/0172828 | A1 | 7/2007 | Schaffer et al. |
| 2008/0103995 | A1 | 5/2008 | Mohamed et al. |
| 2009/0150080 | A1 | 6/2009 | Dawkins et al. |
| 2009/0252718 | A1 | 10/2009 | Jeyaseelan et al. |
| 2009/0292180 | A1 | 11/2009 | Mirow |
| 2010/0113397 | A1 | 5/2010 | Wong et al. |
| 2012/0130928 | A1 | 5/2012 | Bell, Jr. et al. |
| 2012/0130929 | A1 | 5/2012 | Cantin |
| 2013/0006901 | A1 | 1/2013 | Cantin |
| 2013/0006902 | A1 | 1/2013 | Cantin |
| 2013/0173511 | A1 | 7/2013 | Cantin |
| 2013/0173512 | A1 | 7/2013 | Cantin |

FOREIGN PATENT DOCUMENTS

| | | |
|---|---|---|
| WO | 03074558 | 9/2003 |
| WO | 2004104029 | 12/2004 |
| WO | 2005078629 | 8/2005 |
| WO | 2006135345 | 12/2006 |
| WO | 2007123923 | 11/2007 |

OTHER PUBLICATIONS

"Plug-and-Play Macroscopes", Communications of the ACM vol. 54, Issue No. 3 Mar. 2011, 116 pages.

"U.S. Appl. No. 12/948,850 Office Action", Nov. 16, 2012, 13 pages.

"U.S. Appl. No. 12/954,296 Restriction Requirement", Nov. 29, 2012, 6 pages.

"U.S. Appl. No. 13/174,441 Office Action", Jun. 5, 2013, 30 pages.

Affenzeller, Michael et al., "Genetic Algorithms and Genetic Programming: Modern Concepts and Practical Applications", CRC Press, 2009 http://www.crcpress.com/product/isbn/9781584886297 Apr. 9, 2009, pp. 138-139.

Alba, Enrique et al., "Influence of the Migration Policy in Parallel Distributed GAs with Structured and Panmictic Populations", Applied Intelligence vol. 12 Issue 3, May-Jun. 2000, 163-181.

Baluja, Shumeet, "Genetic Algorithms and Explicit Search Statistics", Justsystem Pittsburgh Research Center & School of Computer Science, Carnegie Mellon University 1997, 7 pages.

Bright, Marc et al., "An Efficient Random Number Generation Architecture for Hardware Parallel Genetic Algorithms", Lecture Notes in Computer Science; vol. 1917, pp. 583-588, Year of Publication: 2000 ISBN:3-540-41056-2 Publisher: Springer-Verlag 2000, pp. 583-588.

Colton, Simon, "Lecture 16 Genetic Algorithms", http://www.doc.ic.ac.uk/~sgc/teaching/v231/lecture16.html 2004, 8 pages.

Dubrovsky, Opher et al., "A Genetic Algorithm with a Compact Solution Encoding for the Container Ship Stowage Problem", Journal of Heuristics, vol. 8, Issue 6 (Nov. 2002) pp. 585-599 Year of Publication: 2002, ISSN:1381-1231 http://portal.acm.org/citation.cfm?id=594958.595104&coll=GUIDE&dl=GUIDE&CFID=91858704&CFTOKEN=76504727 Nov. 2002, pp. 585-599.

Ergezer, Mehmet et al., "Oppositional Biogeography-Based Optimization", IEEE publication m.ergezer@ csuohio.edu 2009, pp. 1009-1014.

Gong, Yiyuan et al., "Parallel Genetic Algorithms on Line Topology of Heterogeneous Computing Resources", GECCO '05 Proceedings of the 2005 conference on Genetic and evolutionary computation 2005, 1447-1454.

Greenwell, R.N. et al., "Optimal Mutation Probability for Genetic Algorithms", Mathematical and Computer Modelling vol. 21, No. 8, Apr. 1995, pp. 1-11(11) http://www.ingentaconnect.com/content/els/08957177/1995/00000021/00000008/art00035 Apr. 1995, pp. 1-11.

Jin, Yaochu et al., "Fitness A.pproxhnation in Evolutionary Computation—.A Survey", Proceedings of the Genetic and Evolutionary Computation Conference Email: yaochu.jin@de.hrdeu.com 2002, pp. 1105-1112.

Kargupta, Hillol, "Search, Polynomial Complexity, and the Fast Messy Genetic Algorithm", Illigal Report No. 95008 Oct. 1995, 202 pages.

Mitrevski, P. et al., "Prediction and Speculation Techniques in ILP", 22nd Int. Conf. Information Technology Interfaces ITI2000 pece.mitrevski@uklo.edu.mk; (marjan, infolab)@prof.ukim.edu.mk Jun. 2000, pp. 67-72.

Nowostawski, Mariusz et al., "Dynamic Demes Parallel Genetic Algorithm", May 13, 1999, 6 pages.

Ochoa, Gabriela et al., "Optimal Mutation Rates and Selection Pressure in Genetic Algorithms", Proceedings of the Genetic and Evolutionary Computation Conference (GECCO '00) Jul. 8-12, 2000, 8 pages.

Pal, Sankar K. et al., "Genetic algorithms for pattern recognition", CRC Press, 1996, pp. 69-72 http://www.crcpress.com/product/isbn/

(56) References Cited

OTHER PUBLICATIONS

9780849394676;jsessionid=RF4KzllhxMO3zF3u8Z8sRQ** 1996, p. 69.

Rahnamayan, et al., "Opposition-Based Differential Evolution (ODE) with Variable Jumping Rate", IEEE publication shahryar@pami.uwaterloo.ca, tizhoosh@uwaterloo.ca, m.salama@ece.uwaterloo.ca 2007, pp. 81-88.

Reeves, Colin, "Kluwewer's International Series—Handbook of Metaheuristics", WebSite Link: http://sci2s.ugr.es/docencia/algoritmica/GeneticAlgorithms.pdf Chapter 3 School of Mathematical and Information Sciences, Coventry University, Priory St, Coventry CV1 5FB E-mail: C. Reeves@conventry.ac.uk; http://www.mis.coventry.ac.uk/~colinr/ 2003, 28 pages.

Sen, Ouyang, "An Improved Catastrophic Genetic Algorithm and Its Application in Reactive Power Optimization", http://www.SciRP.org/journal/epe Nov. 2010, pp. 306-312.

Vertanen, Keith, "Genetic Adventures in Parallel: Towards a Good Island Model under PVM", 1998, 12 pages.

Welten, Samuel, "Parallelization of Evolutionary Algorithms", Swiss Federal Institute of Technology Zurich, Systems Optimization Group—Thesis Spring 2008, pp. 1-51.

Xin-Rong, Liu et al., "Application of Catastrophic Adaptive Genetic Algorithm to Reactive Power Optimization of Power System", Artificial Intelligence and Computational Intelligence (AICI), 2010 International Conference Oct. 23-24, 2010, 2 pages.

Yu, Wen et al., "A Catastrophe Based-Parallel Genetic Algorithm", Systems Engineering Institute of Xi'an Jiaotong University, Xi'an710049) Jul. 2001, 4 pages.

U.S. Appl. No. 12/948,850, filed Nov. 18, 2010, Bell, Jr., Robert H., et al.

U.S. Appl. No. 12/954,296, filed Nov. 24, 2010, Cantin, Jason F.

U.S. Appl. No. 13/174,441, filed Jun. 30, 2011, Cantin, Jason F.

U.S. Appl. No. 13/343,558, filed Jan. 4, 2012, Cantin, Jason F.

U.S. Appl. No. 13/592,851, filed Aug. 23, 2012, Cantin, Jason F.

U.S. Appl. No. 13/593,850, filed Aug. 24, 2012, Cantin, Jason F.

U.S. Appl. No. 13/897,584, filed May 20, 2013, Cantin, Jason F.

"U.S. Appl. No. 13/343,558 Office Action", Nov. 21, 2013, 16 Pages.

Skolicki, Zbigniew et al., "The Influence of Migration Sizes and Intervals on Island Models", Jun. 29, 2005, 8 pages.

CONTROLLING QUARANTINING AND BIASING IN CATACLYSMS FOR OPTIMIZATION SIMULATIONS

RELATED APPLICATIONS

This application is a continuation of, and claims the priority benefit of, U.S. application Ser. No. 12/954,296 filed Nov. 24, 2010, which is incorporated herein by reference.

BACKGROUND

Embodiments of the inventive subject matter generally relate to the field of optimization, and, more particularly, to performing cataclysms in optimization simulations.

Optimization algorithms are used to find solutions to optimization problems by starting with an initial set of random candidate solutions (e.g., provided by a user, randomly generated, etc.) and iteratively analyzing and modifying the candidate solutions, according to an objective function, until reaching a satisfactory solution. Optimization algorithms may also be referred to as metaheuristic optimization algorithms, combinatorial optimization algorithms, soft-computing algorithms, etc. For instance, one type of optimization algorithm is an evolutionary algorithm. An evolutionary algorithm uses techniques loosely based on biological evolution, reproduction, mutation, recombination, and natural selection to find solutions to optimization problems. Simulations that implement evolutionary algorithms act upon populations, such that individuals in a population represent candidate solutions to an optimization problem. The candidate solutions are evaluated for fitness (i.e., evaluated according to a fitness function) and the population "evolves" as successive generations of the population are selected/generated and modified loosely based on the biological techniques. As the population evolves, overall fitness of the population tends to increase. A solution to the optimization problem is found when the overall fitness of the population has reached a satisfactory level, or in other words, when the fitness function, or other objective function, evaluates to an optimal solution. Simulations based on optimization algorithms, such as evolutionary algorithms, can perform well for finding solutions to problems in engineering, biology, economics, robotics, etc. because objective functions can be tailored to fit the problems.

SUMMARY

Some embodiments are directed to determining a frequency of occurrence of a first value in a component of a first plurality of candidate solutions for an optimization problem where the first plurality of candidate solutions has converged on a sub-optimal solution during a computer simulation that tests fitness of the first plurality of candidate solutions. Some examples are further directed to determining a second value that is inversely biased from the frequency of occurrence of the first value. Some examples are further directed to including the second value in a component of at least a portion of a second plurality of candidate solutions, where the component of the at least the portion of the second plurality of candidate solutions corresponds to the component of the first plurality of candidate solutions.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
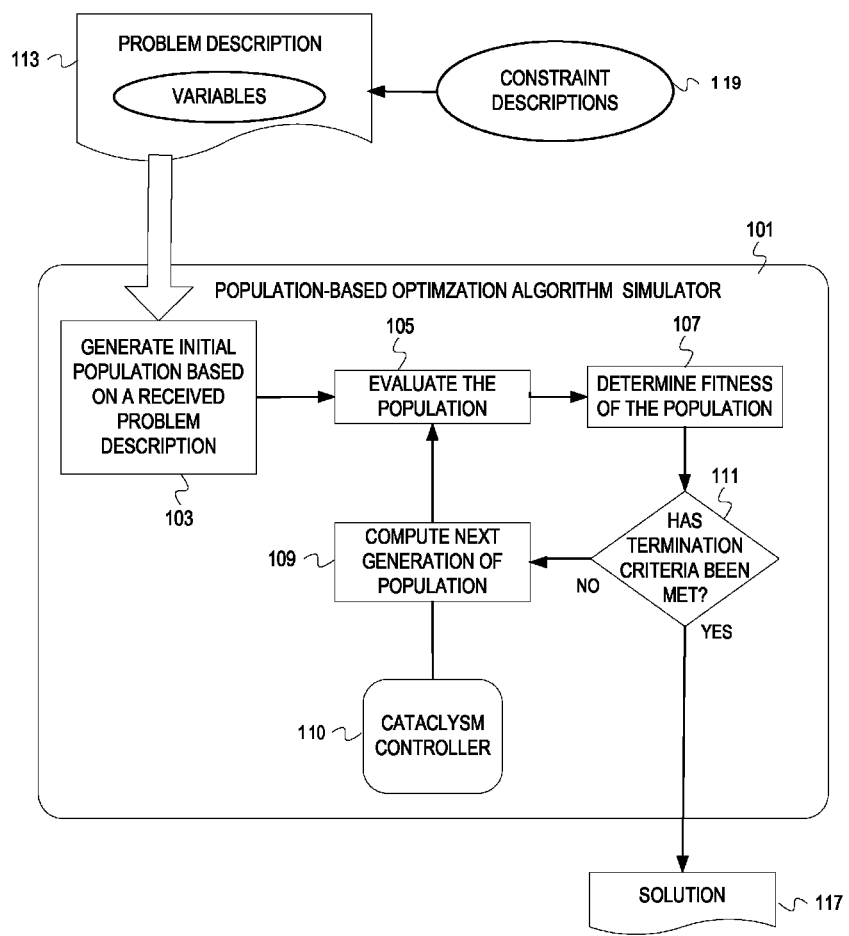
FIG. 1 is an example conceptual diagram of performing an optimization algorithm simulation using a cataclysm controller according to some embodiments.

The description that follows includes exemplary systems, methods, techniques, instruction sequences, and computer program products that embody techniques of the present inventive subject matter. However, it is understood that the described embodiments may be practiced without these specific details. For instance, although examples refer to population-based optimization algorithm simulations some embodiments may utilize non-population based metaheuristics. Further, although some embodiments can utilize specific types of evolutionary algorithms (e.g., genetic algorithms, genetic programming, evolutionary programming, evolution strategy, etc.) suited to fit a particular type of optimization problem being solved, other instances, examples may utilize swarm intelligence algorithms (e.g., ant colony optimization, particle swarm optimization, stochastic diffusion search, gravitational search algorithms, intelligent water drops algorithms, etc.), differential evolution algorithms, artificial life algorithms, cultural algorithms, harmony search algorithms, artificial immune system algorithms (e.g., clonal selection algorithms, negative selection algorithms, immune network algorithms, dendritic cell algorithms, learning classifier system algorithms, learnable evolution model algorithms, etc.), population-based incremental learning algorithms, etc. In other instances, well-known instruction instances, protocols, structures, and techniques have not been shown in detail in order not to obfuscate the description.

As indicated previously, during a simulation for an optimization problem, candidate solutions to an optimization problem can be evaluated against a fitness function. Usually an initial generation of a population (e.g., generation "0") of candidate solutions is unfit and requires many generations, or repeat applications of a population-based optimization algorithm for the population to reach a satisfactory level of fitness. For example, repeat computations of an evolutionary algorithm cause "evolutionary" advancements, or improvements, to a population's fitness level based loosely on biological techniques.

Sometimes, however, the fitness of a population may stagnate. For instance, evolutionary advancements to candidate solutions may plateau, or become largely homogenous. In other words, a population can prematurely converge on one individual from a local optima of the solution space resulting in a sub-optimal solution. Premature convergence can be detected by observing a number of generations since the fitness of the best individual, and/or the average fitness of the population, has improved. Crosses with that individual, combined with genetic drift, result in a loss of genetic variation. The population becomes largely homogenous, made up of similar candidate solutions that exhibit the same salient features. Crosses between pairs of the similar candidate solutions are unable to produce a superior solution. The simulation of the optimization problem, however, may yet produce better solutions if the population is forced to change, or to become less homogenous. To force the population to change requires a breakthrough, or a major shock to the fitness level in the evolutionary process. Some examples of forcing the population to change in evolutionary algorithms include crossovers and mutations to some or all of the candidate solutions. Sometimes, however, crossovers and mutations may not be shocking enough (e.g., a hamming distance is not great enough to generate a major difference to the homogeneity of the candidate solution set). In such examples, a cataclysm is often an effective way of introducing a major shock. A cataclysm attempts to simulate the catastrophic events that punctuate the natural evolutionary process, such as by introducing a large number of randomly-generated candidate solutions or severely-mutating candidate solutions to increase diversity.

One way of performing a cataclysm includes picking out one candidate solution or "individual" (e.g., pick a fit individual) from the population to be a survivor, and then modifying all individuals from the population of candidate solutions (e.g., typically via random mutations) except for the survivor. As generations progress, the survivor interacts with the modified individuals and potentially generates newer and fitter individuals (e.g., breaks the population out of the local optima and begins making progress again). Some approaches to performing cataclysms simply perform cataclysm after cataclysm until the cataclysms stop working (e.g., the survivor individual tends to continue getting fitter and will more quickly dominate a population after a cataclysm).

FIG. 1 is an example conceptual diagram of performing a optimization algorithm simulation using a cataclysm controller according to some embodiments. In FIG. 1, a population-based optimization algorithm simulator 101 receives an optimization problem description ("problem description") 113. The problem description 113 defines the optimization problem. Examples of optimization problems include circuit design, adder design, compiler tuning, etc. The problem description 113 can indicate variables of the optimization problem, a domain for the candidate solutions, constraints, a fitness evaluation function, seed candidate solutions, criteria for inserting the seed candidate solutions, termination criteria, etc. In some embodiments, the problem description 113 may be included in a specification file. Other embodiments, however, may not utilize a specification file, but instead may ascertain the problem description 113 by accessing hard coded instructions, linked information, data input from a user via a graphical user interface, etc. In some embodiments, the problem description 113 may also be constrained, or in other words, may have to meet constraint descriptions 119.

The population-based optimization algorithm simulator 101 generates an initial population (103) (i.e., a population of an initial generation) based on the received problem description. The population comprises a plurality of candidate solutions to the optimization problem. In some embodiments, each of the candidate solutions can be represented by a dataset organized based on the variables of the optimization problem. Each dataset can store one value/parameter for each of the variables, such that an optimization problem with N variables can have datasets comprising N parameters. The population-based optimization algorithm simulator 101 determines a number of candidate solutions to generate based on the problem description 113. For example, the problem description 113 indicates that the population should comprise one hundred candidate solutions. The population-based optimization algorithm simulator 101 can generate parameters for the candidate solutions based on the domain indicated in the problem description 113 and constraint descriptions 119.

After generating the initial population 103, the population-based optimization algorithm simulator 101 begins a population-based optimization algorithm simulation. For example, the population-based optimization algorithm simulator 101 evaluates the population (105). The population-based optimization algorithm simulator 101 can evaluate each candidate solution by applying the parameters indicated in the candidate solutions to variables in the optimization problem and running a simulation of the candidate solution. For example, the problem description 113 can define an electronic design. The population-based optimization algorithm simulator 101 can generate simulation decks for each candidate solution based on applying the parameters indicated by each candidate solution to variables of the electronic design. The population-based optimization algorithm simulator 101 can run a simulation of each simulation deck using a Simulation Program with Integrated Circuit Emphasis (SPICE) simulation tool and collect results of each simulation. As another example, the problem description 113 indicates a computer program to be optimized. The population-based optimization algorithm simulator 101 can run the computer program for each of the candidate solutions by applying the parameters of the candidate solutions to variables of the computer program. The population-based optimization algorithm simulator 101 can collect results of each run of the computer program. The techniques (e.g., SPICE simulations, running computer programs, etc.) for evaluating the population can be defined as part of the fitness evaluation function indicated in the problem description 113.

The population-based optimization algorithm simulator 101 further determines fitness of the population (107). The fitness can be represented by a numerical value within a range specified in the problem description 113. For example, the fitness can be represented by a percentage. Determining fitness of the population 107 can comprise determining individual fitness metrics of each candidate solution. The population-based optimization algorithm simulator 101 can determine each candidate solution's individual fitness metric based on the fitness evaluation function indicated in the problem description 113. For example, the population-based optimization algorithm simulator 101 can analyze the simulation results of each candidate solution based on indicated heuristics. The population-based optimization algorithm simulator 101 can determine the fitness of the population based on aggregating the individual fitness metrics. For example, the population-based optimization algorithm simulator 101 can average the individual fitness metrics. As another example, the population-based optimization algorithm simulator 101 can take the median of the individual fitness metrics.

The population-based optimization algorithm simulator 101 further determines if termination criteria have been met (111). The problem description 113 can indicate termination criteria. For example, the population-based optimization algorithm simulation may terminate when fitness of the population reaches an indicated satisfactory level. As another example, the population-based optimization algorithm simulation may terminate when fitness of the population reaches a plateau. As another example, the population-based optimization algorithm simulation may terminate when a specified number of generations has been reached. The population-based optimization algorithm simulator 101 outputs a solution 117 when termination criteria are met. The solution 117 includes indications of each of the candidate solutions that constitute the population at termination, individual fitness metrics of each of the candidate solutions, simulation/test results, etc.

If the termination criteria have not been met, the population-based optimization algorithm simulator 101 computes (e.g., generates) a next generation of the population (109). For example, the current generation is generation "0," so the population-based optimization algorithm simulator 101 computes a generation "1." The population-based optimization algorithm simulator 101 can compute the next generation in accordance with a combination of biological techniques loosely based on evolution, reproduction, mutation, recombination, and natural selection. For example, the population-based optimization algorithm simulator 101 can select a certain number of the candidate solutions of generation "0" to remain unchanged in generation "1" based on survival of the fittest techniques. The unchanged individuals can represent a portion of the population of generation "1." As another example, the population-based optimization algorithm simulator 101 can select candidate solutions from generation "0" as parents to reproduce offspring candidate solutions for a portion of the population of generation "1." As another example, another portion of the population can be generated based on mutating candidate solutions of generation "0." After the next generation of the population is determined, the population-based optimization algorithm simulator 101 repeats the evaluation (105) and determination of fitness (107) on the next generation. The blocks 105, 107, 111, and 109 repeat for each successive generation until termination criteria is met.

In some embodiments, a cataclysm controller 110 performs cataclysms when populations become homogenous, or when fitness of a population plateaus and settles into a suboptimal solution set (e.g., converges on a suboptimal candidate solution for a local optima of the solution space). The cataclysm controller 110 quarantines a survivor from a first (pre-cataclysmic) population and delays complete integration of the survivor into a second (post-cataclysmic) population until the second population has undergone one or more generations of the post-cataclysm population, but before fitness of the post-cataclysmic population settles on a sub-optimal solution. The cataclysm controller 110 also generates, or assists in generating, a second population (e.g., a modified first population, an entirely new population, etc.) that is inversely, or oppositely, biased from the first population. Examples of quarantining survivors and inversely biasing a population are described in further detail below in FIGS. 2, 3, 4, 5 and 6. Quarantining survivors and biasing a population can be implemented separately or together. Further, although FIG. 1 depicts the cataclysm controller 110 as a component of the population-based optimization algorithm simulator 101, the cataclysm controller 110 can be a separate element from the population-based optimization algorithm simulator 101.

Figure 2:
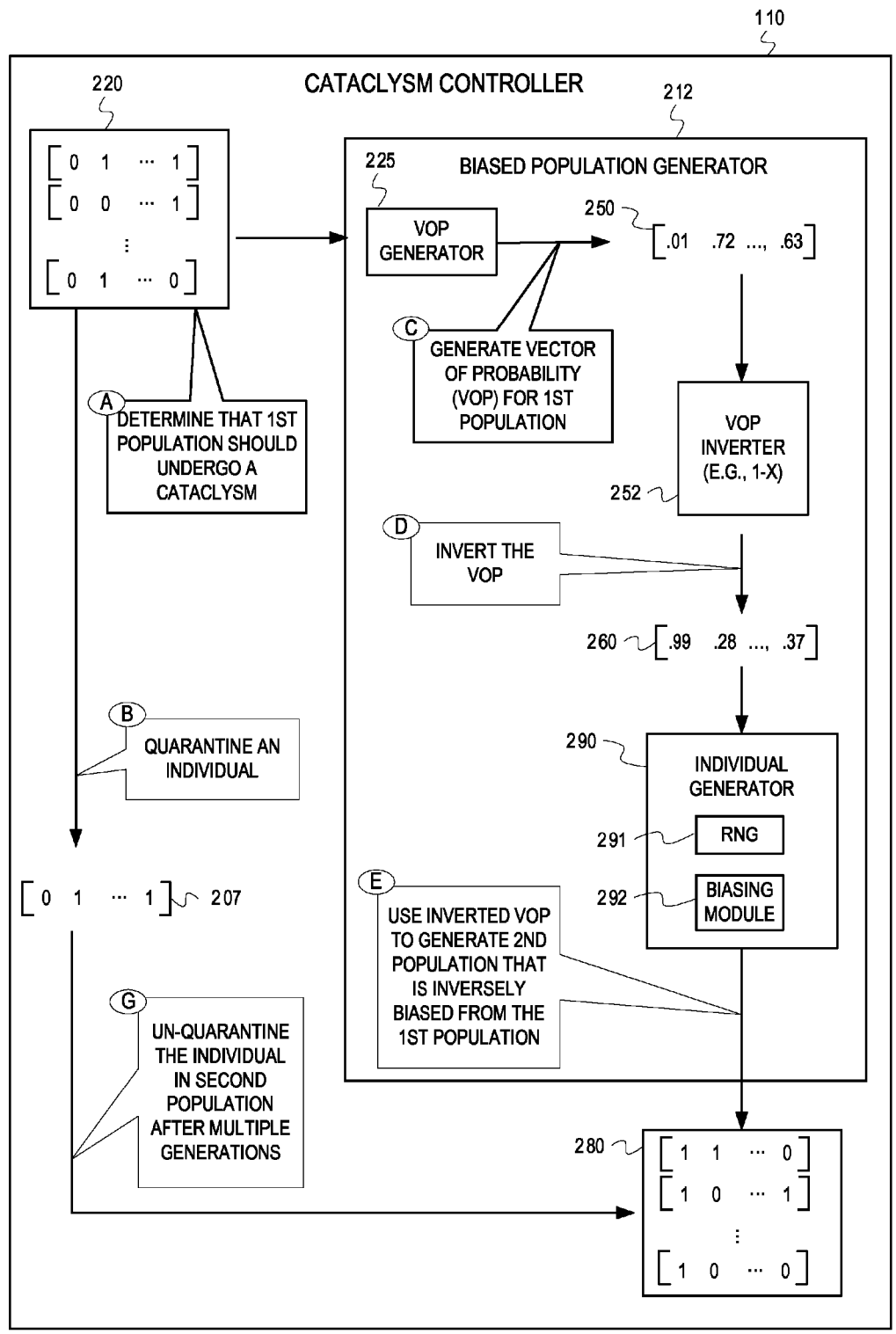
FIG. 2 is an example conceptual diagram depicting quarantining an individual candidate solution and inserting the individual into an inverse biased population after multiple generations of a simulation of an optimization problem.

FIG. 2 is an example conceptual diagram depicting quarantining an individual candidate solution and integrating the individual into an inverse biased population after multiple generations of a simulation of an optimization problem. In FIG. 2, the cataclysm controller 110, at stage "A," determines that a first, pre-cataclysmic population of candidate solutions (first population) 220 should undergo a cataclysm. For instance, the first population 220 has converged on a suboptimal candidate solution for a local optima of the search space and the candidate solutions in the first population 220 have become homogenous. The candidate solutions of the first population 220 may be coded as binary strings, with values of either one ("1") or zero ("0") in each bit position. The cataclysm controller 110, at stage "B," quarantines at least one individual candidate solution (survivor individual) 207 to survive from the first population 220. The survivor individual 207 can be selected for its fitness, meaning that the survivor may be more fit than most of the other candidate solutions in the first population 220 according to a fitness function. However, because the first population 220 is homogenous, most of the candidate solutions in the first population 220 have many of the same characteristics in common as described previously. Consequently, most of the candidate solutions in the first population 220 have most of their bits values in common, with very little difference between each candidate solution. In other words, most of the candidate solutions in the first population 220 have similar degrees of fitness. As a result, the survivor individual 207 may also be selected randomly and have a similar degree of fitness compared to most of the other candidate solutions in the first population 220.

The cataclysm controller 110 includes a biased population generator 212. The biased population generator 212 generates a second population 280 with individuals that are randomly selected, but intentionally inversely biased, or oppositely biased, from the first population 220 and the survivor individual 207. By making the second population 280 inversely biased, more than the majority of the candidate solutions from the second population 280 will be significantly different from the survivor individual 207. For example, the majority of the candidate solutions from the second population 280 will have more than approximately fifty percent (50%) of their bits values different from the bit values of candidate solutions for the first population 220 and from the bit values of the survivor individual 207. In comparison, if the candidate solutions of the second generation 280 were to be generated randomly, without inverse biasing, the candidate solutions from the second population 220 would have approximately 50% of their bits in common with bit values from the survivor individual 207. In other words, when randomly generating an individual for a population, a random number generator would have a choice of between one value of "1" and one value of "0." Thus, the bit has a fifty-fifty (50/50) chance of being a "1" or a "0." However, the biased population generator 212 generates the second population 280 using an inverted vector of probabilities 260 that is inversely biased, or biased away from, averages of bit values for the first population 220. The biased population generator 212 uses the inverted vector of probability 260 to bias bit values of strings in the second population 280 by amounts inversely proportional to a degree of bias of the bit values of candidate solutions in the first population 220 or of the survivor individual 207. In other words, the more settled, or biased, a bit value was in the first population 220, the biased population generator 212 shifts the bias in the opposite direction, or inversely. The inversion of bias causes an increase in effectiveness of the population based optimization algorithm simulator 101 to find more fit individuals in the second population 280, or at least delay the amount of time that a population will converge on a suboptimal solution. The biased population generator 212 intentionally favors individuals that are more different and, thus, introduces a factor, beyond the fitness function itself, that adds diversity to the second population 280 and/or gives enough oppositely biased diversity to give the second population 280 a chance to survive long enough to yield a possible improvement to first population 220 before the survivor individual 207 begins to dominate the second population 280. In other words, the newly generated individuals from the second population 280 are biased away from the makeup of individuals in the first population 220 encouraging searching of more distant/different parts of the solution space. The average individual is more different than a survivor individual than under conventional schemes, requiring more time for crosses with the survivor and its descendents to reconverge, and hence allowing more time for a superior individual to emerge.

The biased population generator 212 inversely biases the second population 280 from the first population 220 by, at stage "C," generating a vector of probability (VOP) 250 for the first population 220. The vector of probability includes percentages that represent a number of times that bit values for any given bit position of a string in the first population 220 is a value of "1." For example, a VOP generator 225 looks at a first bit position for all candidate solution strings in the first population 220 and determines a percentage of the number of times, over the entire population, that the first bit position had a bit value of "1." The first bit of all of the candidate solutions strings in the first population 220 may have been a "1," for instance, only 1% of the time. The VOP generator 225 thus writes in the first position of the VOP 250 a value of "0.01," which is the percentage value of "1%" written in a proportion format. The VOP generator 225 does the same for all bit positions of the candidate solution strings of the first population 220 and respectively, for each bit position, writes into the VOP 250 a corresponding proportion percentage, or probability value, that the bit value was a "1" in the first population 220. For example, the VOP generator 250 determines that the first bit position of candidate solution strings of the first population 220 was a "1" value 1% of the time, the second bit position of candidate solution strings of the first population 220 was a "1" value 72% of the time, and so forth to the last bit position of candidate solution strings of the first population 220 which was a "1" value 63% of the time. The VOP generator 250, then writes corresponding proportion values (e.g., 0.01, 0.72 . . . , 0.63) in the VOP 250. At stage "D," the biased population generator 212, via a VOP inverter 252, inverts the VOP 250, generating an inverted VOP (IVOP) 260. The VOP inverter 252, for instance, subtracts each of the proportion values in the VOP 260 from the numerical value of "1," resulting in an opposing or inverted percentage. In other words, if the first bit of the VOP 250 was a value of "0.01" then the corresponding inverted bit in the IVOP 260 would be a value of "0.99," and so forth for all of the values of the VOP 250 (e.g., the first value of the IVOP 260 is 0.01, the second value of the IVOP 260 is 0.28, and so forth for all values of the IVOP 260 with the last value of the IVOP 260 being 0.37). The biased population generator 212, at stage "E," via an individual generator 290, generates random numbers on a scale equivalent to the a size of the proportional values of the IVOP 260 (e.g., a random number generator 291 generates random numbers from "0.00" to "0.99" which matches a number of decimal points used by the proportional values of the IVOP 260). The individual generator 290 then converts the random number to a value of "1" if the random numbers fall within an equivalent percentage value range represented by the values of the IVOP 260. For example, a biasing module 292 converts a random number of "0.23" to a "1" because it falls within a range of 0.0 to 0.98, representative of the "0.99" value, specified by the first value in the IVOP 260. If the random numbers falls outside an equivalent percentage value range represented by the values of the IVOP 260, then the biasing module 292 converts the random number to a value of "0." The individual generator 290 then organizes the 1's and the 0's into bit strings that represent the candidate solutions of the second population 280.

At stage "G," the cataclysm controller 120 un-quarantines the survivor individual 207 in the second population 280 after the population-based optimization algorithm simulator 101 has calculated multiple generations of the second population 280. For example, the cataclysm controller 110 delays the introduction of the survivor individual 207 into the second population 280 until the second generation 280 has received some level of fitness, otherwise the survivor individual 207 would quickly dominate the second population 280 and would cause the second population 280 to quickly become homogenous with candidate solutions similar to those of the first population 220. However, the cataclysm controller 110 does not delay the introduction of the survivor individual 207 so long that the second population 280 plateaus again. The delay causes the second population 280 to have enough diversity of candidate solutions so that the survivor individual 207 can compete and have a chance of making evolutionary advancements over the first population 220. In some embodiments, the cataclysm generator 110 can delay introduction of the survivor individual 207 until the second population 280 has experienced at least one generation but no more than approximately 10 generations.

Further, although FIG. 2 depicts the biased population generator 212 as a component of the cataclysm controller 110, the biased population generator 212 can be a separate element from the cataclysm controller 110. Further, one or more of the components of the biased population generator 212 may be separate, such as the random number generator 291.

Figure 3:
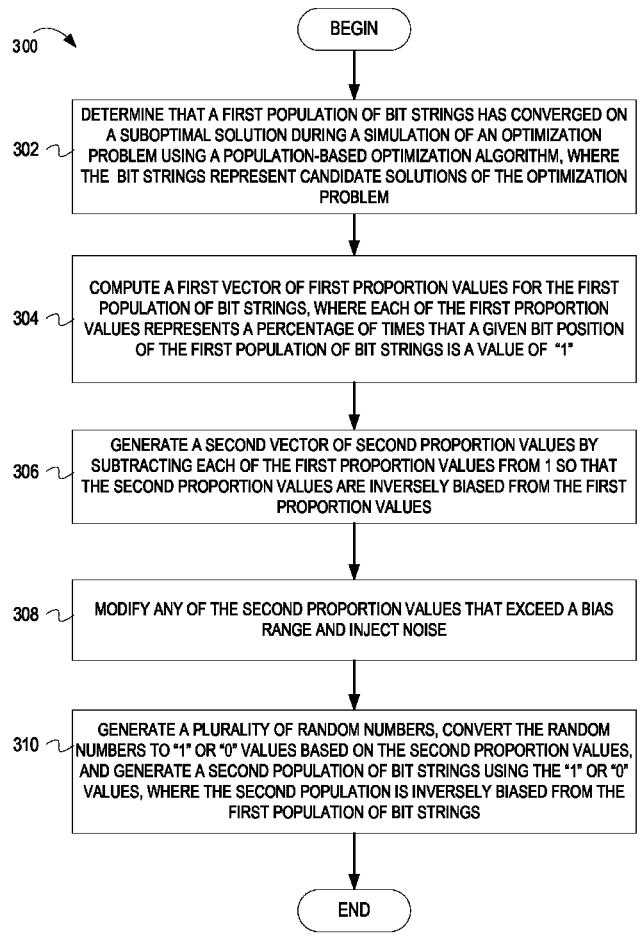
FIG. 3 is a flowchart depicting example operations for generating an inversely biased population during a simulation of an optimization problem.
Figure 4:
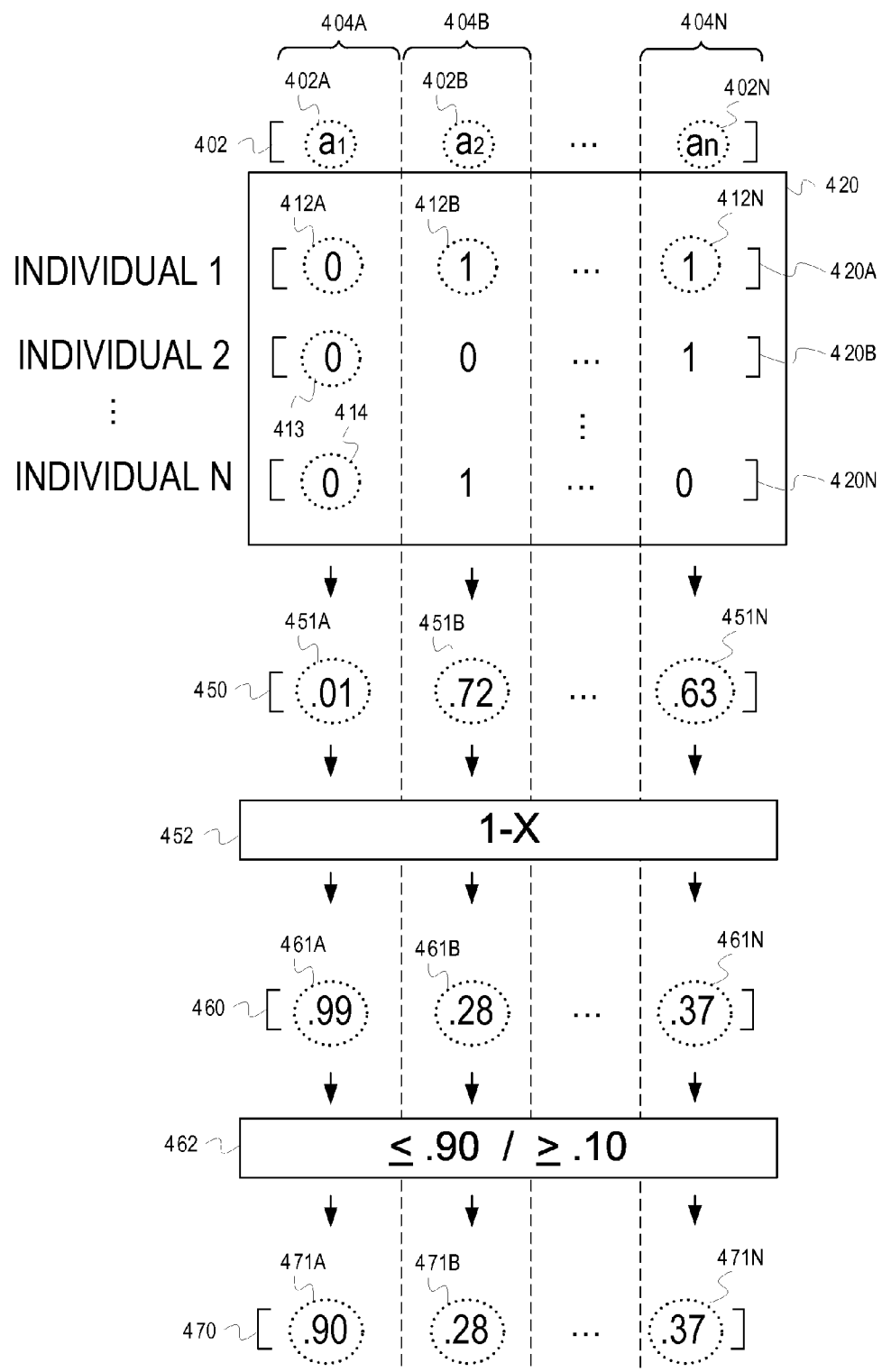
FIGS. 4 and 5 are example conceptual diagrams of generating an inversely biased population during a simulation of an optimization problem.
Figure 5:
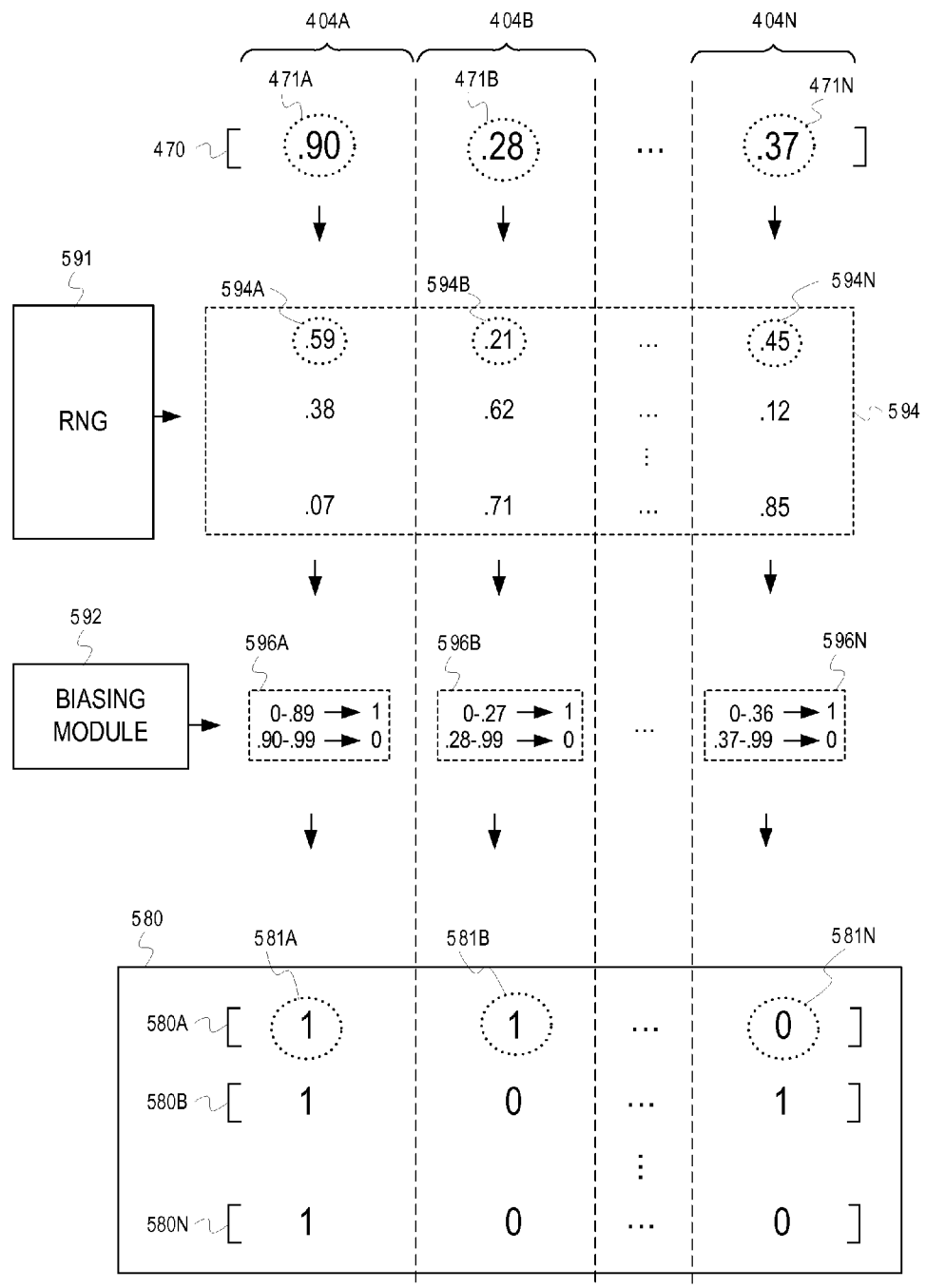

FIG. 3 is a flowchart depicting example operations for generating an inversely biased population during a simulation of an optimization problem. For exemplary purposes, operations associated with the blocks in FIG. 3 will be described as being performed by a system associated with a population-based optimization algorithm simulation. The system performs the flow 300 of FIG. 3. The system includes, in some embodiments, the population-based optimization algorithm simulator 101, the cataclysm controller 110, the VOP generator 225, the VOP inverter 252, the individual generator 290, the random number generator 291, the biasing module 292, etc. of FIGS. 1 and 2. In some embodiments, the system may include any of the elements described in FIGS. 4 and 5. Further, in some embodiments, the system is similar to the system 700 specified in FIG. 7. Further, FIGS. 4 and 5 are example conceptual diagrams of generating an inversely biased population during a simulation of an optimization problem and will be referred to in concert with FIG. 3. Referring to FIG. 3, the system determines that a first population of bit strings has converged on a suboptimal solution during a simulation of an optimization problem using a population-based optimization algorithm, where the bit strings represent candidate solutions of the optimization problem (302).

Further, the system computes a first vector of first proportion values for the first population of bit strings, where each of the first proportion values represents a percentage of times that a given bit position of the first population of bit strings is a value of "1" (304). For example, referring now to FIG. 4, a first population of candidate solutions ("first population") 420 includes N number of individual candidate solutions structured, for example, as binary bit strings ("bit strings") 420A-N. Each of the bit strings 420A-N is a separate instance of a specific vector space ("vector") 402, with a sequence of values 402A-N that are organized in bits positions ("positions") 404A-N. Thus, each of the bit strings 420A-N have an equivalent length (i.e., an equal number of bits), and each bit represents an equivalent portion of a potential solution. All of the bits in the bit strings 420 A-N are binary values, meaning either one of two values, typically the numerical values of zero ("0") or one ("1"). For example, a first bit string 420A includes a first bit value 412A that has a value of "0", a second bit value 412B that has a value of "1," and all other bits values of the first bit string 420A are either "0" or "1" until the final bit value 412N, which has a value of "1." It should be noted that although the bit values 412A-N may not necessarily each represent a complete potential solution value for each variable of an optimization problem, but may only be a bit in a larger value that represents one potential solution value for one variable. For instance, the "0" value of the first bit value 412A and the "1" value of the second bit value 412B do not separately represent potential values for separate variables of the optimization problem, but may be only the first two binary bits of a specific number of bits (e.g., "0100110") which together constitute a single numerical value (e.g., "38") that represents a potential solution value for one variable of the optimization problem. Other specific numbers of bits may follow in the first bit string 420A for all other variables of the optimization problem for the one candidate solution for the first bit string 420A. Further, the bit strings 420A-N may also be string-based abstractions of a tree structure, a formula, an equation, an operator, a code block or any other type of optimization problem elements. However, each bit position 404A-N represents an equivalent portion of a potential solution across all bit positions 404A-N (e.g., the first bit 412A of the first bit string 420A, the first bit 413 of the second bit string 420B, and the first bit 414 of the last bit string 420N all represent the first bit of potential values for the same variable in the optimization problem description). The system generates a single dimensional vector of probabilities ("VOP") 450 with an equal number of probability values 451A-N as there are numbers of bits positions 404A-N. In one embodiment, the probability values 451A-N each represent a percentage of times that bit values in the positions 404A-N are a value of "1." In other words, for instance, the system counts the number of times that the first bit values that correspond to the first position 404A, for all of the bit strings 420A-N, are the value of "1" and divides the count by the number of bit strings 420A-N to generate the first probability value 451A. For example, the system starts with the first bit string 420A, examines the first bit value 412A, and determines that the value is not a "1." The system moves on to the second bit string 420B, examines the bit value 413 and also determines that the value is not a "1", then moves on to each successive bit string, incrementing a count when the system examines that the value of the first bit value for the bit string is a "1" until reaching the last bit value 414. If, for instance, there were one hundred bit strings 420A-N and one of the bits in the first position 404A were a value of "1", the system would divide the value of one by the value of one hundred to derive a percentage of 1%, which is equivalent to a proportion value of "0.01." The system then writes the proportion value of "0.01" as the first probability value 451A. The system then repeats the iterative count for the second position 404B, and divides by the number of bit strings 420A-N, and calculates a second probability value 451B of "0.72" (e.g., 72% of the bit values for the second position 404B are a value of "1"). The system repeats the iterative counts and divisions for each of the positions 404A-N, until determining a final probability value 451N of "0.63" (e.g., 63% of the bit values for the final bit position 404N are a value of "1").

It should be noted that despite the number of bit strings 420A-N, the system can round the percentage values to generate a probability value that fits a required format (e.g., so that the probability value is a proportion value of a certain number of decimal points). For example, if there were one-thousand bit strings 420A-N and the count for the bit values of the first position 404A came to a count total of "8", and if the system divided "8" by "1000," the actual percentage would come to a value of "0.008." However, to fit a two decimal proportion, the system can round up to a value of "0.01". Further, in other embodiments, the probability values 451A-N could represent a percentage of times that bit values in the positions 404A-N are a value of "0" instead of the value of "1." The value of "1" or "0" can be pre-specified by a user (e.g., a user specifies, via a tool, prior to calculating the vector of probabilities, to count the percentage of times that the bit value is "1" versus "0" or vice-versa). In other embodiments, however, the system can determine whether to choose "1" or "0" as the number to count based on analysis of the first population. The system could, for example, choose the "1" or the "0" value based on whether fewer 1's or 0's exist in the bit strings of the first population. Further, in some embodiments the system can optionally add random noise to the VOP 450 by randomly choosing a small subset of the probability values 451A-N and adding a small random value to small subset (e.g., 0-5%) of the probability values 451A-N.

Returning to FIG. 3, the system further generates a second vector of second proportion values by subtracting each of the first proportion values from 1 so that the second proportion values are inversely biased from the first proportion values (306). In FIG. 4, for example, a VOP inverter 452 individually subtracts all of the probability values 451A-N from the value of "1" to generate an inverted VOP 460 with inverted probability values 461A-N. For instance, the VOP inverter 452 subtracts the value of "0.01" for the first probability value 451A from the value of "1," which results in a first inverted probability value 461A of "0.99". The system subtracts the value of "0.72" for the second probability value 451B from the value of "1," which results in a second inverted probability value 461B of "0.28" and so forth until the generating the last inverted probability value 461N of "0.37".

Returning to FIG. 3, the system optionally modifies any of the second proportion values that exceed a bias range (308). For example, in FIG. 4, an excessive bias adjustment unit 462 can modify any of the inverted probability values 461A-N if they are above or below specific threshold probability values. For instance, the excessive bias adjustment unit 462 is configured to modify any of the inverted probability values 461A-N that are over the value of "0.90" down to the value of "0.90" and modify any of the inverted probability values 461A-N that are under the value of "0.10" up to the value of "0.10". The first inverted probability value 461A is the value of "0.99," which is excessively high according to threshold settings for the excessive bias adjustment unit 462, and thus modifies the first inverted probability value 461A down to a value of "0.90". In some embodiments, the excessive bias adjustment unit 462 can be configured to other ranges of threshold values. In some embodiments, the excessive bias adjustment unit 462 can set the thresholds based on input from a user. In some embodiments, the excessive bias adjustment unit can automatically modify the threshold values based on an overall amount of excessive bias in the inverted VOP 460. For example, the system can change the threshold range based on a number of the inverted probability values 461A-N that are excessively biased. The excessive bias adjustment unit 462 thus ensures that none of the inverted probability values 461A-N are too highly biased toward a "1" or a "0," ultimately leading to increased diversity in a post-cataclysmic population. The excessive bias adjustment unit 462 generates a modified inverted VOP 470. The modified inverted VOP 470 includes modified inverted probability values 471A-N. In some embodiments, the system can modify any of the probability values 451A-451N if excessively biased instead of, or in addition to, modifying the inverted probability values 461A-461N. In other words, the excessive bias adjustment unit 462 can modify probability values at any point after generating the VOP 450.

Returning again to FIG. 3, the system further generates a plurality of random numbers, converts the random numbers to "1" or "0" values based on the second proportion values, and generates a second population of bit strings using the "1" or "0" values, where the second population is inversely biased from the first population of bit strings (310). For example, in FIG. 5 a random number generator 591 generates random numbers 594. The random number generator 591 is configured to generate the random numbers 594 in range of values from "0" to "0.99," or some other number range that can be used to represent percentage values (e.g., "0" to "99" or some other number range that can be scaled to 100 units). For a first random number 594A, a biasing module 592 can utilize a first converter 596A that uses a conversion factor equivalent to the first modified inverted probability value 471A. In other words, because the first modified inverted probability value 471A is a value of "0.90", the first converter 596A is configured to convert the first random number 594A to a value of "1" if the first random number 594A is between "0" and "0.89" and convert the first random number to a value of "0" if the first random number 594A is between "0.90" and "0.99". As an example, the first random number 594A is a value of "0.59". According to the conversion factor of the first converter 596A, the first converter 596A converts the value of "0.59" to a value of "1". The system then inserts the value of "1" as a first bit value 581A of a first bit string 580A for a second population 580 of bit strings 580A-N. The system converts, via a second converter 596B, a second random number 594B from a value of "0.21" to a value of "1" and inserts the value of "1" as a second bit value 581B of the first bit string 580A. The second converter 596B has a conversion factor that matches the second modified inverted probability value 471B. The system continues to convert random numbers in a first row of the random numbers 594 into "1" or "0" values and inserting the "1" or "0" values into the first bit string 580A until a final converter 596N converts a final random number 594N from a value of "0.45" to a value of "0" as a final bit value 581B of the first bit string 580A. The final converter 596B has a conversion factor that matches the final modified inverted probability value 471N. The system repeats conversion of all rows of the random numbers 594 into bit strings 580A-N.

If the system used a purely random number generator (e.g., 50/50 chance of either a "1" or a "0") without the biasing module 592, then the system would generate the second population 580 having approximately fifty percent of its bit values in common with bit values from the first population 420. However, by generating random numbers within a number range that can be used to represent percentage values and using the biasing module 592, the system generates the second population 580 to have most of its bit values inversely biased away from bit values from the first population 420. The use of the converters 596A-N are similar to use of a multi-faced die (e.g., a hundred-sided die) where the number of the faces on the die vary for each converter 596A-N based on the value of the modified inverted probability values 471A-N. For example, using the example of the hundred-sided die, for the first converter 596A, ninety of the sides of the hundred-sided die would represent a value of "1" and ten of the sides would the value of "0." A random roll of the die would have a 90% change of producing a "1" and a 10% change of producing a "0." Thus, although the roll of the die is random, the probabilities of a certain outcome are biased in favor of either a "1" or a "0" value based on the value of the modified inverted probability value 471A. For the second converter 596B, twenty eight of the sides would represent a "1" and seventy-two of the sides would represent a "0" etc.

Figure 6:
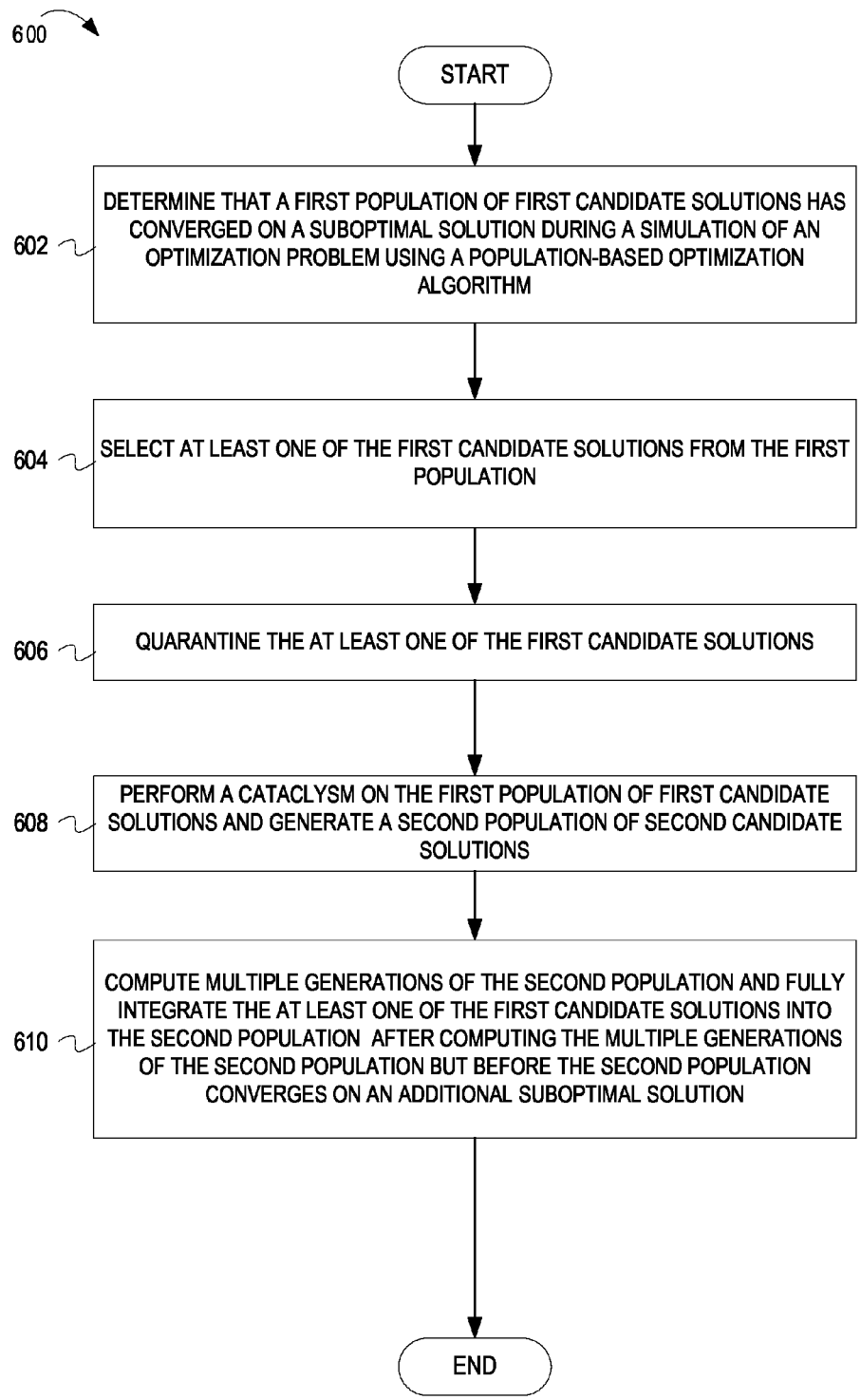
FIG. 6 is a flowchart depicting example operations for quarantining an individual from a first population of candidate solutions during a simulation of an optimization problem and integrating the individual in a second population of candidate solutions.

FIG. 6 is a flowchart depicting example operations for quarantining an individual from a first population of candidate solutions during a simulation of an optimization problem and integrating the individual in a second population of candidate solutions. For exemplary purposes, operations associated with the blocks in FIG. 6 will be described as being performed by a system associated with a population-based optimization algorithm simulation. The system performs the flow 600 of FIG. 6. The system includes, in some embodiments, the population-based optimization algorithm simulator 101, the cataclysm controller 110, the VOP generator 225, the VOP inverter 252, the individual generator 290, the random number generator 291, the biasing module 292, etc. of FIGS. 1 and 2. In some embodiments, the system may include any of the elements described in FIGS. 4 and 5. Further, in some embodiments, the system is similar to the system 700 specified in FIG. 7. Referring to FIG. 6, the system determines that a first population of first candidate solutions has converged on a suboptimal solution during a simulation of an optimization problem using a population-based optimization algorithm (602). In some embodiments, the first population of candidate solutions may be string based (e.g. bit strings), trees, or any other type of individual used in a population-based optimization algorithm simulation.

Further, the system selects at least one of the first candidate solutions from the first population (604). In some embodiments, the system selects the at least one of the first candidate solutions using elitist selection, fitness-based or ranked-based selection, random selection, or some combination thereof. For example, in one embodiment, the system selects the at least one of the first candidate solutions (survivor individual) because it has a high degree of fitness according to a fitness function for the optimization problem. In some embodiments, the system selects only one of the first candidate solutions to survive a cataclysm. In other embodiments, however, the system selects multiple ones of the first candidate solutions. The system can select the survivor individual using a random selection and evaluate the selected survivor individual to ascertain sufficient fitness according to fitness criteria in the fitness function. If a selected survivor individual is not sufficiently fit, then the system selects different one(s) of the first candidate solutions and evaluates their fitness until finding at least one individual that is sufficiently fit according to the fitness criteria. In some embodiments, the system can provide a tool so that users can select a survivor individual(s).

Further, the system quarantines the at least one of the first candidate solutions (606). For example, the system can store a copy of the at least one of the first candidate solutions on a computer-readable storage medium for later use. In some embodiments, the system can store the remainder of the first candidate solutions of the first population for future reference. In another embodiment, the system can mark the survivor individual(s) such that that survivor individual(s) are not allowed to participate in genetic operations (other than reproduction) for multiple generations that follow.

Further, the system performs a cataclysm on the first population of first candidate solutions and generates a second population of second candidate solutions (608). In some embodiments, the system can perform a mass-extinction type of cataclysm which kills off, removes, or otherwise disregards the first population and randomly generates a second population. In some embodiments, the system can perform a mass mutation type of cataclysm where the first population is replaced with severely mutated versions of the individuals from the first population (e.g., 15-25% of the bits are flipped to significantly change the individuals). In some embodiments, the system generates the second population using the inverse biasing as described previously. In some embodiments, the system provides a tool that allows users to select a type of cataclysm, or other parameters associated with the cataclysm. One should note that a second population may also be a highly modified version of the first population (e.g., by modifying candidate solutions from the first population instead of, or in addition to, discarding and replacing candidate solutions from the first population). Thus, the second population may also be referred to a population that is new, modified, post-cataclysmic, or some other phrase that specifies it is different from the first population and no longer in a state that is converged on a sub-optimal solution.

Further, the system computes multiple generations of the second population and fully integrates the at least one of the first candidate solutions into the second population after computing the multiple generations of the second population but before the second population converges on an additional sub-optimal solution (610). For example, the system can delay the introduction of a copy of the at least one of the first candidate solutions into the second population. In another embodiments, the system can introduce the at least one of the first candidate solutions (survivor individual) into the second population immediately, but mark the survivor individual and restrict the survivor individual's ability to compete until after computing the multiple generations. By waiting to fully integrate the survivor individual until after multiple generations, the system gives the second population time to generate its own fit individuals, according to the fitness function. In other words, the simulation of the population-based algorithm and waits to fully integrate (e.g., introduce, unmark, unrestrict, etc.) the survivor individual(s) into the simulation until a number of generations are computer for the second population after the cataclysm. The sooner the system fully integrates the survivor individual(s) into the second population, the more quickly the survivor individual(s) may influence (e.g., dominate) the second population. However, if the system waits too long, (e.g., beyond approximately 10 generations), then the second population will begin to converge on its own suboptimal solution and become too homogenous. Therefore, in some embodiments, the system fully integrates the quarantined survivor individual(s) into the second population after one generation has been computed but no less than approximately 10 generations have been computed according to the fitness function of a population-based optimization algorithm after the cataclysm.

In some embodiments, the system can run multiple simulations where each simulation converges on separate suboptimal solutions. After each simulation converges on the separate suboptimal solutions, the system may select a survivor from each of the simulations and perform a cataclysm to the rest of the populations for all of separate populations (e.g., eliminate all other candidate solutions from the populations other than the survivors). The system can then generate a second population and then insert the multiple survivors into the second population after multiple generations so that all of the multiple survivors can compete within the second population.

As will be appreciated by one skilled in the art, aspects of the present inventive subject matter can be used to optimize all types of optimization problems such as problems regarding electronics, thermodynamics, physics, aeronautics, acoustics, etc. Further, it should be noted that although inverse-biasing was described above for binary solution representations (e.g., binary strings), other embodiments can include extending or applying inverse-biasing to tools with non-binary solution representations (e.g., by intentionally favoring different values regardless of whether the values are binary in nature). Further, to avoid creating an inverse bias that is too heavily biased away from a survivor (i.e., to avoid creating a second population that is homogeneous in its heavy bias away from a survivor), some embodiments may include limiting a scale to the bias so that the second population is biased away from a survivor by more than approximately 50% but also highly random. For instance, some embodiments can cap a bias at 10%, or alternatively scale the difference between the bit-frequency and 50%. For example, in the case of scaling the different between the bit-frequency and 50%, if the bit is set 99% of the time, for example, some embodiments may divide (0.99–0.50) by some scale factor "X" (e.g., (0.99–0.50)/X), add back the 0.50, and then subtract from 1.0 to invert the bit value. The scale factor (X) could be determined randomly, from 0 to 10 for example, for each cataclysm.

Further, it should be noted that although examples above describe computing generations of a population, other examples may include processing an objective function until pre-specified criteria has been satisfied (e.g., for a specific amount of time, until a specific percentage of bits in a population have a specific value, etc.). For instance, some optimizations algorithms may process an objective function in ways that do not necessarily compute generations, unlike evolutionary algorithms which do compute generations using a fitness function. Some embodiments of the invention, therefore, may quarantine an individual, process the objective function (e.g., compute optimizations according to the objective function) until the specific criteria has been satisfied (e.g., for a period of time), then integrate the quarantined individual after the specific criteria has been satisfied.

Further, as will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
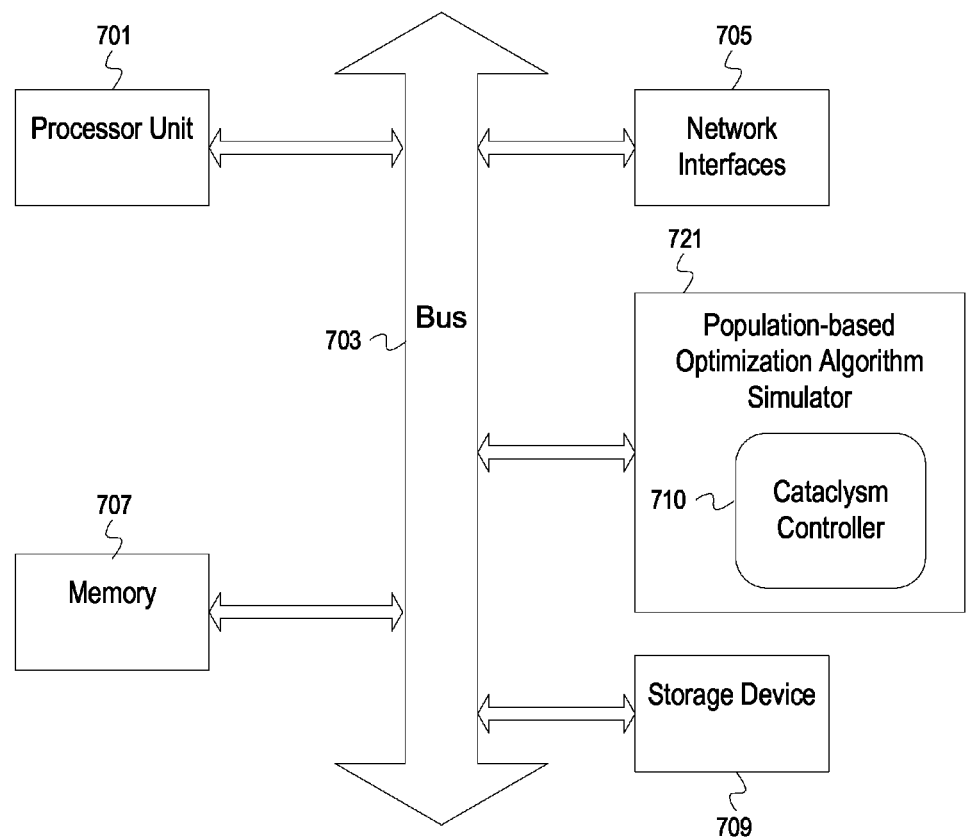
FIG. 7 depicts an example computer system.

FIG. 7 depicts an example computer system. A computer system includes a processor unit 701 (possibly including multiple processors, multiple cores, multiple nodes, and/or implementing multi-threading, etc.). The computer system includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 703 (e.g., PCI bus, ISA, PCI-Express bus, HyperTransport® bus, InfiniBand® bus, NuBus bus, etc.), a network interface 705 (e.g., an ATM interface, an Ethernet interface, a Frame Relay interface, SONET interface, wireless interface, etc.), and a storage device(s) 709 (e.g., optical storage, magnetic storage, etc.). The computer system also includes a population-based optimization algorithm simulator 721. The population-based optimization algorithm simulator 721 finds solutions to optimization problems in accordance with population-based optimization algorithms. The population-based optimization algorithm simulator 721 comprises a cataclysm controller 710. The cataclysm controller 710 can control cataclysms during a simulation of a population-based optimization algorithm. Any one of these functionalities may be partially (or entirely) implemented in hardware and/or on the processing unit 701. For example, the functionality may be implemented with an application specific integrated circuit, in logic implemented in the processing unit 701, in a co-processor on a peripheral device or card, etc. Further, realizations may include fewer or additional components not illustrated in FIG. 7 (e.g., video cards, audio cards, additional network interfaces, peripheral devices, etc.). The processor unit 701, the storage device(s) 709, and the network interface 705 are coupled to the bus 703. Although illustrated as being coupled to the bus 703, the memory 707 may be coupled to the processor unit 701.

While the embodiments are described with reference to various implementations and exploitations, it will be understood that these embodiments are illustrative and that the scope of the inventive subject matter is not limited to them. In general, techniques for optimizing seeding of population-based optimization algorithm simulations as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer-implemented method comprising:
   determining a frequency of occurrence of a first value in a component of a first plurality of candidate solutions for an optimization problem, wherein the first plurality of candidate solutions has converged on a sub-optimal solution during a computer simulation that tests fitness of the first plurality of candidate solutions;
   determining a second value that is inversely biased from the frequency of occurrence of the first value; and including the second value in a component of at least a portion of a second plurality of candidate solutions, wherein the component of the at least the portion of the second plurality of candidate solutions corresponds to the component of the first plurality of candidate solutions.

2. The computer-implemented method of claim 1, wherein each of the first plurality of candidate solutions has a first arrangement of a first plurality of bits that is equivalent to a second arrangement of a second plurality of bits in the second plurality of candidate solutions, wherein the component of the first plurality of candidate solutions is one of the first plurality of bits, wherein the component of the second plurality of candidate solutions is one of the second plurality of bits, and wherein a bit position of the one of the first plurality of bits within the first arrangement corresponds to a bit position of the one of the second plurality of bits within the second arrangement.

3. The computer-implemented method of claim 1, wherein the determining the frequency of occurrence of the first value comprises computing the frequency of occurrence as a percentage value less than or equal to a numerical value of 1, and wherein the determining the second value that is inversely biased from the frequency of occurrence of the first value comprises subtracting the percentage value from the numerical value of 1.

4. The computer-implemented method of claim 1, wherein the including the second value in the component of the at least the portion of the second plurality of candidate solutions comprises including the second value in more than approximately fifty percent of the second plurality of candidate solutions.

5. The computer-implemented method of claim 1, wherein the including the second value in the component of the at least the portion of the second plurality of candidate solutions comprises:
generating a random number within a numerical range, wherein the second value represents a percentage that scales to the numerical range;
determining that the random number is within a subset of the numerical range that corresponds to the second value;
converting the random number to a bit value of 1 in response to determining that the random number is within the subset of the numerical range that corresponds to the second value; and
inserting the bit value of 1 into the component of the at least the portion of the second plurality of candidate solutions.

6. The computer-implemented method of claim 5, wherein the numerical range is equivalent to a number of the first plurality of candidate solutions.

7. The computer-implemented method of claim 1, wherein the including the second value in the component of the at least the portion of the second plurality of candidate solutions comprises:
generating a random number within a numerical range, wherein the second value represents a percentage that scales to the numerical range;
determining that the random number is within a subset of the numerical range that corresponds to the second value;
converting the random number to a bit value of 0 in response to the determining that the random number is within the subset of the numerical range that corresponds to the second value; and
inserting the bit value of 0 into the component of the at least the portion of the second plurality of candidate solutions.

8. The computer-implemented method of claim 1 further comprising:
determining that the frequency of occurrence of the first value is beyond a range of one or more specific values; and
modifying the second value to be within the threshold of the one or more specific values before the including the second value in the component of the at least the portion of the second plurality of candidate solutions.

9. An apparatus comprising:
a processing unit; and
a computer readable storage medium configured to store instructions which, when executed by the processing unit, perform one or more operations to
determine a frequency of occurrence of a first value in a position of a first plurality of candidate solutions for an optimization problem, wherein the first plurality of candidate solutions has converged on a sub-optimal solution during a computer simulation that tests fitness of the first plurality of candidate solutions,
determine a second value that is inversely biased from the frequency of occurrence of the first value, and
include the second value in a position of at least a portion of a second plurality of candidate solutions, wherein the position of the at least the portion of the second plurality of candidate solutions corresponds to the position of the first plurality of candidate solutions.

10. The apparatus of claim 9, wherein each of the first plurality of candidate solutions has a first arrangement of a first plurality of bits that is equivalent to a second arrangement of a second plurality of bits in the second plurality of candidate solutions, wherein the position of the first plurality of candidate solutions corresponds to a bit position of one of the first plurality of bits within the first arrangement, and wherein the position of the second plurality of candidate solutions corresponds to a bit position of one of the second plurality of bits within the second arrangement.

11. The apparatus of claim 9, wherein the operation to determine the frequency of occurrence of the first value comprises an operation to compute the frequency of occurrence as a percentage value less than or equal to a numerical value of 1, and wherein the operation to determine the second value that is inversely biased from the frequency of occurrence of the first value comprises an operation to subtract the percentage value from the numerical value of 1.

12. The apparatus of claim 9, wherein the operation to include the second value in the position of the at least the portion of the second plurality of candidate solutions includes operations to:
generate a random number within a numerical range, wherein the second value represents a percentage that scales to the numerical range;
determine that the random number is within a subset of the numerical range that corresponds to the second value;
convert the random number to a bit value of 1 in response to determination that the random number is within the subset of the numerical range that corresponds to the second value; and
insert the bit value of 1 into the position of the at least the portion of the second plurality of candidate solutions.

13. The apparatus of claim 9, wherein the operation to include the second value in the position of the at least the portion of the second plurality of candidate solutions comprises operations to:
  generate a random number within a numerical range, wherein the second value represents a percentage that scales to the numerical range;
  determine that the random number is within a subset of the numerical range that corresponds to the second value;
  convert the random number to a bit value of 0 in response to determination that the random number is within the subset of the numerical range that corresponds to the second value; and
  insert the bit value of 0 into the position of the at least the portion of the second plurality of candidate solutions.

14. The apparatus of claim 9, further comprising operations to:
  determine that the frequency of occurrence of the first value is beyond a range of one or more specific values; and
  modify the second value to be within the threshold of the one or more specific values before the second value is included in the position of the at least the portion of the second plurality of candidate solutions.

15. A computer program product for generating candidate solutions during a simulation of an optimization problem using an optimization algorithm, the computer program product comprising:
  a non-transitory, computer readable storage medium having computer readable program code embodied therewith, the computer readable program code configured to
    determine a frequency of occurrence of a first value in a position of a first plurality of candidate solutions for an optimization problem, wherein the first plurality of candidate solutions has converged on a sub-optimal solution during a computer simulation that tests fitness of the first plurality of candidate solutions,
    determine a second value that is inversely biased from the frequency of occurrence of the first value, and
    include the second value in a position of at least a portion of a second plurality of candidate solutions, wherein the position of the at least the portion of the second plurality of candidate solutions corresponds to the position of the first plurality of candidate solutions.

16. The computer program product of claim 15, wherein each of the first plurality of candidate solutions has a first arrangement of a first plurality of bits that is equivalent to a second arrangement of a second plurality of bits in the second plurality of candidate solutions, wherein the position of the first plurality of candidate solutions corresponds to a bit position of one of the first plurality of bits within the first arrangement, and wherein the position of the second plurality of candidate solutions corresponds to a bit position of one of the second plurality of bits within the second arrangement.

17. The computer program product of claim 15, wherein the computer readable program code is configured to:
  compute the frequency of occurrence as a percentage value less than or equal to a numerical value of 1; and
  subtract the percentage value from the numerical value of 1.

18. The computer program product of claim 15, wherein the computer readable program code is configured to:
  generate a random number within a numerical range, wherein the second value represents a percentage that scales to the numerical range;
  determine that the random number is within a subset of the numerical range that corresponds to the second value;
  convert the random number to a bit value of 1 in response to determination that the random number is within the subset of the numerical range that corresponds to the second value; and
  insert the bit value of 1 into the position of the at least the portion of the second plurality of candidate solutions.

19. The computer program product of claim 15, wherein the computer readable program code is configured to:
  generate a random number within a numerical range, wherein the second value represents a percentage that scales to the numerical range;
  determine that the random number is within a subset of the numerical range that corresponds to the second value;
  convert the random number to a bit value of 0 in response to determination that the random number is within the subset of the numerical range that corresponds to the second value; and
  insert the bit value of 0 into the position of the at least the portion of the second plurality of candidate solutions.

20. The computer program product of claim 15, wherein the computer readable program code is configured to:
  determine that the frequency of occurrence of the first value is beyond a range of one or more specific values; and
  modify the second value to be within the threshold of the one or more specific values before the second value is included in the position of the at least the portion of the second plurality of candidate solutions.

* * * * *